US011943363B2

United States Patent
Sheets et al.

(10) Patent No.: US 11,943,363 B2
(45) Date of Patent: Mar. 26, 2024

(54) SERVER-ASSISTED PRIVACY PROTECTING BIOMETRIC COMPARISON

(71) Applicant: Visa International Service Association, San Francisco, CA (US)

(72) Inventors: John F. Sheets, San Francisco, CA (US); Kim R. Wagner, Sunnyvale, CA (US); Sunpreet Singh Arora, San Mateo, CA (US); Lacey Best-Rowden, San Mateo, CA (US); Chunxi Jiang, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 881 days.

(21) Appl. No.: 16/769,425

(22) PCT Filed: Jul. 25, 2018

(86) PCT No.: PCT/US2018/043656
§ 371 (c)(1),
(2) Date: Jun. 3, 2020

(87) PCT Pub. No.: WO2019/112650
PCT Pub. Date: Jun. 13, 2019

(65) Prior Publication Data
US 2021/0367786 A1    Nov. 25, 2021

Related U.S. Application Data

(60) Provisional application No. 62/596,250, filed on Dec. 8, 2017.

(51) Int. Cl.
*H04L 9/32*    (2006.01)
*H04L 9/00*    (2022.01)
*H04L 9/08*    (2006.01)

(52) U.S. Cl.
CPC ............ *H04L 9/3231* (2013.01); *H04L 9/008* (2013.01); *H04L 9/0825* (2013.01); *H04L 9/0894* (2013.01)

(58) Field of Classification Search
CPC ..... H04L 9/3231; H04L 9/008; H04L 9/0825; H04L 9/0894
(Continued)

(56) References Cited

U.S. PATENT DOCUMENTS

2007/0061590 A1*  3/2007  Boye ..................... G06F 21/305
                                                                  713/186
2011/0264919 A1   10/2011  Pizano et al.
(Continued)

FOREIGN PATENT DOCUMENTS

CN      101479987 A    7/2009
RU      2434340 C2    11/2011

OTHER PUBLICATIONS

RU2020122027 , "Office Action", dated Dec. 20, 2021, 12 pages.
(Continued)

*Primary Examiner* — Moeen Khan
(74) *Attorney, Agent, or Firm* — Kilpatrick Townsend & Stockton LLP

(57) ABSTRACT

Described herein are a system and techniques for enabling biometric authentication without exposing the authorizing entity to sensitive information. In some embodiments, the system receives a biometric template from a user device which is encrypted using a public key associated with the system. The encrypted biometric template is then provided to a second entity along with a biometric identifier. Upon receiving a request to complete a transaction that includes the biometric identifier and a second biometric template, the second entity may encrypt the second biometric template using the same public key associated with the system and
(Continued)

perform a comparison between the two encrypted biometric templates. The resulting match result data file is already encrypted and can be provided to the system to determine an extent to which the two biometric templates match.

18 Claims, 6 Drawing Sheets

(58) Field of Classification Search
USPC ........................................................ 713/186
See application file for complete search history.

(56) References Cited

U.S. PATENT DOCUMENTS

| | | |
|---|---|---|
| 2014/0115324 A1 | 4/2014 | Buer |
| 2014/0337635 A1 | 11/2014 | Konvalinka |
| 2014/0337930 A1 | 11/2014 | Hoyos et al. |
| 2014/0363058 A1* | 12/2014 | Emmett ............... G06V 40/193 |
| | | 382/117 |
| 2015/0381348 A1* | 12/2015 | Takenaka ............. H04L 9/3093 |
| | | 380/30 |
| 2017/0094507 A1 | 3/2017 | Liu et al. |
| 2017/0104597 A1 | 4/2017 | Negi et al. |
| 2017/0134375 A1* | 5/2017 | Wagner .................. G06F 21/32 |

OTHER PUBLICATIONS

Abidin et al., "Security Aspects of Privacy-preserving Biometric Authentication Based on Ideal Lattices and Ring-LWE", IEEE International Workshop on Information Forensics and Security (WIFS), Dec. 3, 2014, pp. 60-65.
EP18885355.0 , "Extended European Search Report", dated Dec. 18, 2020, 7 pages.
Simoens et al., "Analysis of Biometrie Authentication Protocols in the Blackbox Model", Arxiv.org, Cornell University Library, Jan. 13, 2011, pp. 1-10.
Torres et al., "Effectiveness of Fully Homomorphic Encryption to Preserve the Privacy of Biometric Data", Information Integration and Web-Based Applications & Services, Dec. 4-6, 2014, pp. 152-158.
PCT/US2018/043656 , "International Search Report and Written Opinion", dated Nov. 2, 2018, 11 pages.
SG11202004415T , "Written Opinion", dated Apr. 11, 2022, 8 pages.
EP18885355.0 , "Office Action", dated Feb. 10, 2023, 9 pages.
Application No. CN201880079139.6 , Office Action, dated Jul. 20, 2023, with Translation, 15 pages.
Abidin et al., "Security Aspects of Privacy-Preserving Biometric Authentication Based on Ideal Lattices and Ring-LWE", IEEE International Workshop on Information Forensics and Security (WIFS), Dec. 3-5, 2014, 6 pages.
Application No. SG11202004415T , Written Opinion, dated Sep. 21, 2023, 7 pages.

* cited by examiner

SERVER-ASSISTED PRIVACY PROTECTING BIOMETRIC COMPARISON

CROSS-REFERENCE TO RELATED APPLICATIONS

The present application is a 371 National Phase of PCT Patent Application No. PCT/US2018/043656, filed on Jul. 25, 2018, and claims the benefit of and priority to U.S. Provisional Patent Application No. 62/596,250, filed Dec. 8, 2017, which is fully incorporated by reference herein.

BACKGROUND

One way in which access to a user's electronic devices or electronic data can be protected is through the use of biometric authentication. In biometric authentication, a biometric sample obtained in relation to a user may be compared to biometric information stored in relation to that user. Biometric comparisons can be made locally or remotely via a server. A local match, (e.g. a match resulting from comparisons made on a user's mobile device), can be appropriate in a variety of different situations. For example, biometric comparisons can be made locally even if the user's mobile device has no data connections with other devices. Another situation in which biometric comparisons should be made locally may be when it is preferable that biometric information obtained for a user never leaves the user's mobile device.

On the other hand, a server-based comparison, where a match is made to an enrollment template stored remotely on a server, can be appropriate if other considerations take priority, such as the size of the comparison software or its runtime, or a desire to make it easy for the user to use multiple devices, change devices, etc. A server-based comparison also addresses the case where it is desired to have several different applications on the user's mobile device share one enrollment template, without being limited to biometric solutions provided at the operating system level (such as Touch ID or Face ID).

Embodiments of the invention address the server-based approach and some current shortcomings of that approach, a risk of compromise of the private biometric data as it resides on the server. For example, in server-based approach, biometric data or templates may be stored in the server. This can be problematic in case there is a data breach. If a data breach occurs, this can have particularly harmful consequences as biometric data or templates may not be substituted or changed like passwords and passcodes. In addition, in the server based approach, even if one entity is able to store data securely, it is unlikely that all data provided by all service providers can store biometric data securely. As such, existing server-based biometric comparison systems are not scalable.

Embodiments of the invention address these and other problems individually and collectively.

SUMMARY

Described herein are a system and techniques for enabling biometric authentication without exposing the authorizing entity to sensitive information. In embodiments of the disclosure, the system is able to perform biometric match analysis for a another entity without maintaining records of biometric data. In some embodiments, the system receives a biometric template during an enrollment phase which is encrypted using a public key associated with the system. The encrypted biometric template is then provided to a second entity which can use the encrypted biometric template to authenticate a user of a transaction without having access to the content in the encrypted biometric template. The second entity (e.g., a match server) may receive a request to complete a transaction that include a second biometric template. The second entity may encrypt the second biometric template using the same public key associated with the system and perform a comparison between the two encrypted biometric templates without the need to decrypt them. The resulting match result data file is inherently encrypted and can be provided to the system to determine an extent to which the two biometric templates match.

One embodiment of the invention is directed to a method comprising: receiving, by a first server computer, authentication data for a user from a user device, determining a biometric identifier to be associated with the authentication data, transmitting the biometric identifier to a second server computer along with a first encrypted biometric template associated with the user. The second server computer subsequently receives a second encrypted biometric template and the biometric identifier from the user device, and generates an encrypted match value data file by comparing the first encrypted biometric template and the second encrypted biometric template. The method also includes receiving the encrypted match value data file, decrypting the encrypted match value data file to determine an decrypted match value data file, and determining, from the decrypted match value data file, a match likelihood value.

Another embodiment of the invention is directed to a server computer comprising: a processor; and a non-transitory computer-readable storage medium having code embodied thereon, the code being configured to cause the processor to: receive authentication data for a user from a user device, determine a biometric identifier to be associated with the authentication data, transmit the biometric identifier to a second server computer along with a first encrypted biometric template associated with the user, wherein the second server computer subsequently receives a second encrypted biometric template and the biometric identifier from the user device, and generates an encrypted match value data file by comparing the first encrypted biometric template and the second encrypted biometric template, receive the encrypted match value data file, decrypt the encrypted match value data file to determine an decrypted match value data file, and determine, from the decrypted match value data file, a match likelihood value.

Further details regarding embodiments of the invention can be found in the Detailed Description and the Figures.

DETAILED DESCRIPTION

Figure 1:
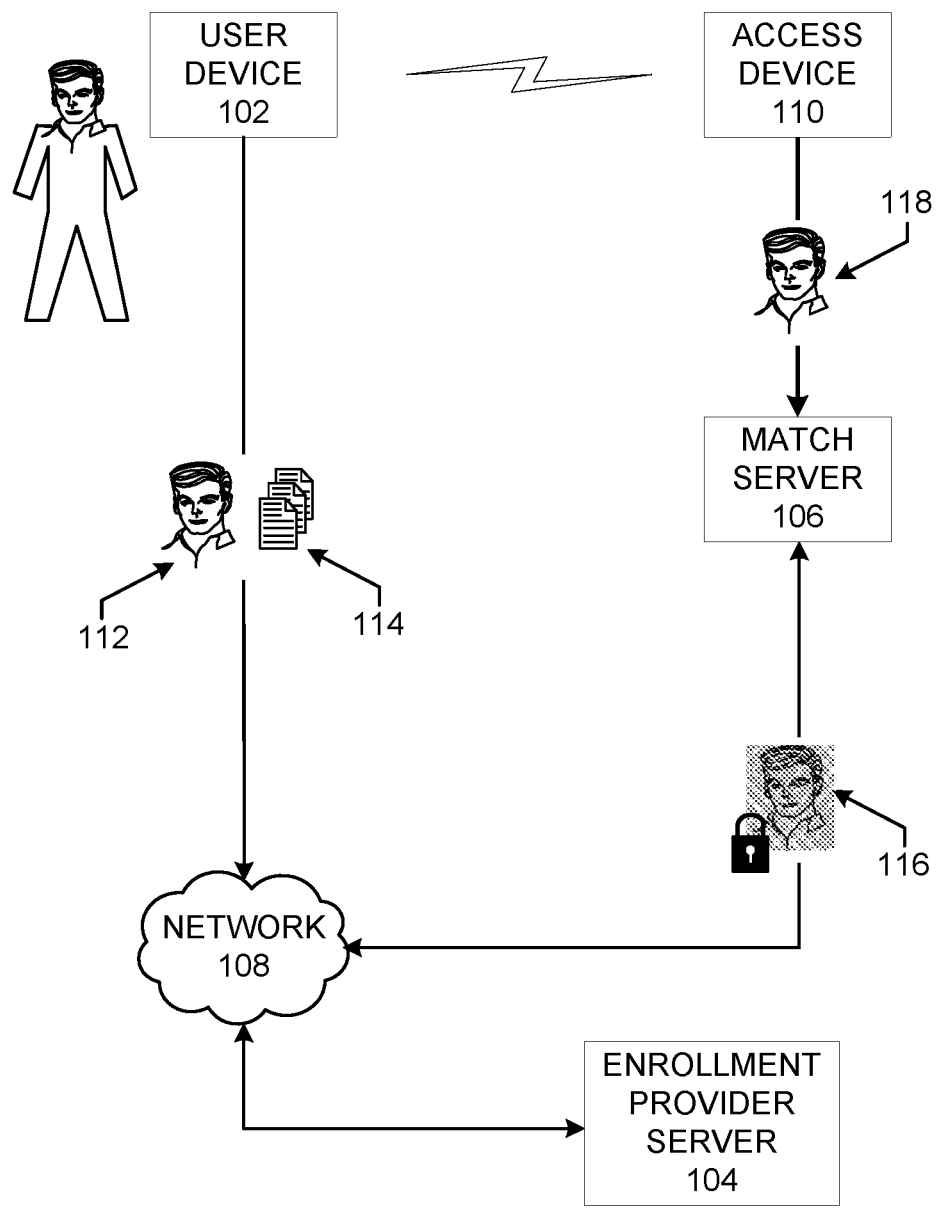
FIG. 1 shows a system comprising a number of components according to an embodiment of the invention.

Prior to discussing embodiments of the invention, some terms can be described in further detail.

An "application" may be a computer program that is used for a specific purpose.

"Authentication" may include a process for verifying an identity of something (e.g., a user). One form of authentication can be biometric authentication.

A "biometric" may be any human characteristic that is unique to an individual. For example, a biometric may be a person's fingerprint, voice sample, face, DNA, retina, etc.

A "biometrics interface" may be an interface across which biometrics information is captured. Biometrics interfaces include a thumb print scanner, an iris or retina scanner, a camera, a microphone, a breathalyzer, etc. Biometrics interfaces may be present on user devices, such as mobile devices, or present at an access terminal.

A "biometric reader" may include a device for capturing data from an individual's biometric. Examples of biometric readers may include fingerprint readers, front-facing cameras, microphones, and iris scanners.

A "biometric sample" may include data obtained by a biometric reader. The data may be either an analog or digital representation of the user's biometric, generated prior to determining distinct features needed for matching. For example, a biometric sample of a user's face may be image data. In another example, a biometric sample of a user's voice may be audio data.

A "biometric template" or "biometric sample template" may include a file containing distinct characteristics extracted from a biometric sample that may be used during a biometric authentication process. For example, a biometric template may be a binary mathematical file representing the unique features of an individual's fingerprint, eye, hand or voice needed for performing accurate authentication of the individual.

A "computing device" may be any suitable device that can receive and process data. Examples of computing devices may include access devices, transport computers, processing network computers, or authorization computers.

The term "cryptographic key" may refer to something used in encryption or decryption. As an example, a cryptographic key could refer to a product of two large prime numbers. A cryptographic key may serve as an input in a cryptographic process, such as RSA or AES, and may be used to encrypt plaintext and produce a ciphertext output, or decrypt ciphertext and produce a plaintext output.

The term "homomorphic encryption" may refer to any suitable technique for encrypting data that allows for computation on the resulting ciphertexts, generating an encrypted result which, when decrypted, matches the result of the operations as if they had been performed on the plaintext. It should be noted that computing devices can perform difficult computations on homomorphically-encrypted data without ever having access to the unencrypted data.

An "issuer" may typically refer to a business entity (e.g., a bank) that maintains an account for a user. An issuer may also issue payment credentials stored on a user device, such as a cellular telephone, smart card, tablet, or laptop to the consumer.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "private key" may include any encryption key that may be protected and secure. For example, the private key may be securely stored at an entity that generates a public/private key pair and may be used to decrypt any information that has been encrypted with the associated public key of the public/private key pair.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "public key" may include any encryption key that may be shared openly and publicly. The public key may be designed to be shared and may be configured such that any information encrypted with the public key may only be decrypted using an private key associated with the public key (i.e., a public/private key pair).

A "public/private key pair" may include a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a certification authority (i.e., certificate authority) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss.

A "resource provider" may be an entity that can provide a resource such as a good, service, data, etc. to a requesting entity. Examples of resource providers may include merchants, governmental entities that can provide access to data, data warehouses, entities that can provide access to restricted locations (e.g., train station operators), etc. In some embodiments, resource providers may be associated with one or more physical locations (e.g., supermarkets, malls, stores, etc.) and online platforms (e.g., e-commerce websites, online companies, etc.). In some embodiments, resource providers may make physical items (e.g., goods, products, etc.) available to the user. In other embodiments, resource providers may make digital resources (e.g., electronic documents, electronic files, etc.) available to the user. In other embodiments, resource providers may manage access to certain services or data (e.g., a digital wallet provider).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "user" may include an individual. In some embodiments, a user may be associated with one or more personal accounts and/or user devices.

A "user device" may be any suitable device that is operated by a user. Suitable user devices can communicate with external entities such as portable devices and remote server computers. Examples of user devices include mobile phones, laptop computers, desktop computers, server computers, vehicles such as automobiles, household appliances, wearable devices such as smart watches and fitness bands, etc.

FIG. 1 shows a system 100 comprising a number of components according to an embodiment of the invention. The system 100 comprises at least a user device 102, an enrollment provider server 104, and a match server 106. The components of the system 100 may communicate directly or using some network 108. In some embodiments, the system may include one or more access device 110. In some embodiments, the access device 110 and the match server 106 may be the same entity or may be operated by the same entity. The enrollment provider server 104 may be an example of a first server computer and the match server 106 may be an example of a second server computer. The enrollment provider server computer 104 is typically distinct from and is spatially or logically separate of the match server 106.

As depicted, the system may include a user device 102. The user device 102 may be any electronic device capable of communicating with an enrollment provider server 104 and/or an access device 110. In some embodiments, the user device 102 may be a mobile device (e.g., a smart phone). In some embodiments, biometric information (e.g., an image of) for a user may be captured using a camera of the user device 102 and transmitted to an enrollment provider server 104 for processing. In some embodiments, at least a portion of the functionality described herein may be executed via a mobile application installed upon the user device 102. The user device 102 may be configured to obtain a biometric sample from the user, which may then be used to enroll the user in the described system.

In some embodiments, the user device 102 may obtain the biometric sample from the user and generate a biometric template 112 from that biometric sample. The biometric template 112 may then be encrypted and transmitted to the enrollment provider server 104. For example, in some embodiments, the biometric template may be encrypted using an encryption key specific to the user device 102. In another example, the biometric template may be encrypted using a public encryption key (of a public/private key pair) associated with the enrollment provider server 104.

In some embodiments, the user device 102 may also provide account information 114 to the enrollment provider server 104. For example, the user may be asked to select, or provide, at least one primary account number (PAN) to be linked to the functionality described herein. In this example, the PAN may be provided to the enrollment provider server 104. It should be noted that in some embodiments, account information may be provided to the enrollment provider server 104 through a separate channel (i.e., by a device other than the user device 102).

As depicted, the system may include an enrollment provider server 104 (i.e., a first server computer). The enrollment provider server 104 may be any computing device capable of performing at least a portion of the functionality described herein. In some embodiments, the enrollment provider server 104 may receive biometric information from the user device 102 and may process that biometric information in relation to one or more accounts. The enrollment provider may create and distribute, in a suitable manner, an enrollment provider application (e.g., a mobile application to be installed upon, and executed from, user device 102). The enrollment provider server 104 may typically be a system associated with an issuer or entity (e.g., a bank) that has a business relationship with a match server 106 or other entity.

The enrollment provider server 104 may be configured to encrypt the biometric template 112 received from the user device 102 using a public key associated with the enrollment provider server 104. In some embodiments, the enrollment provider server 104 may first decrypt the biometric template 112 before re-encrypting the biometric template 112 received from the user device 102 using a public key associated with the enrollment provider server 104. For example, if the biometric template 112 has been encrypted by the user device 102 using an encryption key specific to the user device 102, then the enrollment provider server 104 may decrypt the biometric template 112 using a decryption key specific to the user device 102 and may re-encrypt the biometric template 112 using a public key associated with the enrollment provider server 104. The enrollment provider server 104 may transmit the encrypted biometric template 116 to a match server 106. In some embodiments, the biometric template 112 may be deleted or otherwise removed from the memory of the enrollment provider server 104 once the encrypted biometric template 116 has been sent to the match server 106.

The enrollment provider server 104 may be further configured to receive an encrypted comparison between two biometric templates and determine a likelihood of a match. In some embodiments, this may involve first decrypting an encrypted comparison data file generated by the match server 106. Once decrypted, the enrollment provider server 104 may process the received comparison data file using any suitable biometric authentication techniques. In some embodiments, the enrollment provider server 104 may respond to the match server 106 with an indication of the likelihood that the biometric templates match. In some embodiments, the likelihood that the biometric templates match may be represented as a percentage.

As depicted, the system may include match server 106 (i.e., a second server). The match server 106 may be capable of receiving data, performing computations, transmitting data, etc. In some embodiments, the match server 106 may be configured to receive and process a request from access device 110. The request received from the access device 110 may include a biometric template 118 generated by the access device 110 for a user that wishes to complete a transaction. The match server 106 may be configured to encrypt the biometric template 118 using a public key associated with the enrollment provider server 104 and to compare the encrypted biometric template to the encrypted biometric template 116 received from the enrollment provider server 104. When encrypting the biometric template 118, the match server 106 may use encryption techniques substantially similar to those used by the enrollment provider server 104 to encrypt the biometric template 116.

Once the match server 106 has encrypted biometric template 118, the match server 106 may compare the encrypted biometric template 118 to the encrypted biometric template 116. It should be noted that the two templates need not be decrypted to be compared if both biometric templates have been encrypted using homomorphic encryption techniques. Indeed, the match server 106 may not even be capable of decrypting either biometric template. Once the match server 106 has generated a comparison of the encrypted data, the match server 106 may transmit that comparison to the enrollment provider server 104. The enrollment provider server 104 may respond to the match server 106 with an indication as to the likelihood that the two biometric templates are a match. In some embodiments, the match server 106 may then determine whether the likelihood value is greater than some predetermined threshold value and, based on that determination, may provide the access device 110 with an indication as to whether to approve or decline the transaction.

The network 108 may be any suitable communication network or combination of networks. Suitable communications networks may include any one or a combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

An access device 110 may be configured to manage access to a particular resource. Upon receiving a request from a user to access that resource, the access device 110 may be configured to obtain a biometric sample from that user. The access device 110 may then generate a second biometric template 118 (e.g., an authentication template) using a process substantially similar to the process used by the user device 102 to generate the biometric template 112. The biometric template 118 may then be transmitted to the match server 106 for authentication. In some embodiments, the access device 110 may receive a response from the match server 106 that includes an indication of whether the transaction has been authenticated. The access device 110 may then complete the transaction in a manner similar to conventional manners using the account information provided via the user device 102.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
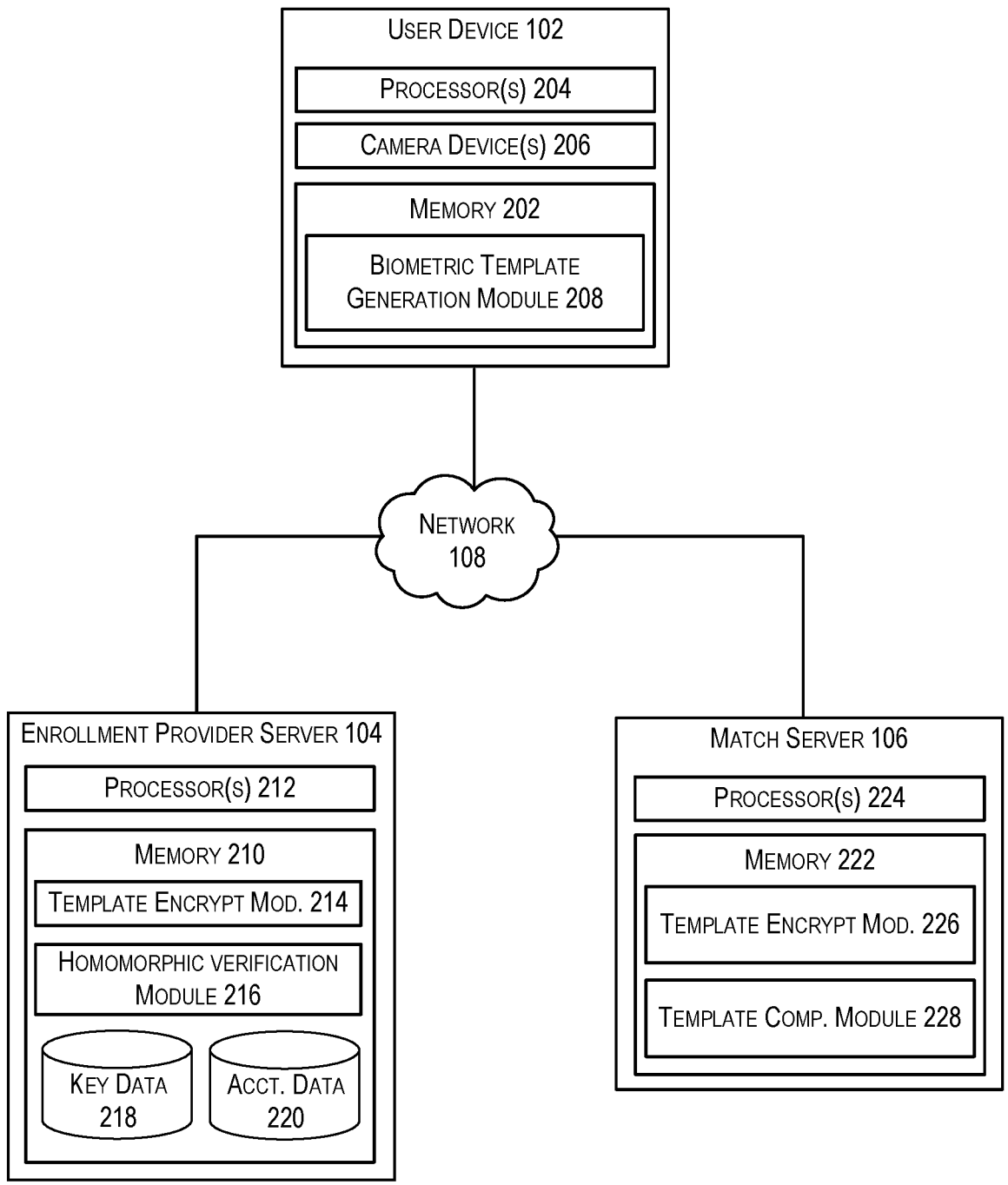
FIG. 2 depicts an illustrative example of a system or architecture in which techniques for enabling biometric authentication without exposing the authorizing entity to sensitive information may be implemented.

FIG. 2 depicts an illustrative example of a system or architecture 200 in which techniques for enabling biometric authentication without exposing the authorizing entity to sensitive information may be implemented. In architecture 200, one or more consumers and/or users may utilize a user device 102. In some examples, the user device 102 may be in communication with an enrollment provider server 104 and/or an access device via a network 108, or via other network connections. The access device may, in turn, be in communication with a match server 106. User device 102, enrollment provider server 104, network 108, and match server 106 may be examples of the respective components depicted in FIG. 1.

The user device 102 may be any type of computing device such as, but not limited to, a mobile phone, a smart phone, a personal digital assistant (PDA), a laptop computer, a desktop computer, a server computer, a thin-client device, a tablet PC, etc. The user device 102 may include a memory 202 and one or more processors 204 capable of processing user input. The user device 102 may also include one or more input sensors, such as camera devices 206, for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. In some embodiments, camera devices 206 may include a number of different types of camera devices, one or more of which may be a range camera device (e.g., a depth sensor) capable of generating a range image, and another of which may be a camera configured to capture image information. Accordingly, biometric information obtained via a camera device may include image information and/or depth information (e.g., a range map of a face).

Embodiments of the application on the user device 102 may be stored and executed from its memory 202. The memory 202 may store program instructions that are loadable and executable on the processor(s) 204, as well as data generated during the execution of these programs. Depending on the configuration and type of user device 102, the memory 202 may be volatile (such as random access memory (RAM)) and/or non-volatile (such as read-only memory (ROM), flash memory, etc.). The user device 102 may also include additional storage, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM) or ROM. Turning to the contents of the memory 202 in more detail, the memory 202 may include an operating system and one or more application programs or services for implementing the features disclosed herein including at least a module for generating a biometric template from a biometric sample (biometric template generation module 208). The memory 202 may also include instructions that cause the user device 102 to encrypt any generated biometric template. In some embodiments, the biometric template may be encrypted using an encryption key specific to the user device 102. In some embodiments, the biometric template may be encrypted using a public encryption key associated with the enrollment provider server 104.

In some embodiments, the biometric template generation module 208 may comprise code that, when executed in conjunction with the processors 204, causes the user device 102 to obtain a biometric sample from a user and generate a biometric template from that biometric sample. In some embodiments, a biometric template may be a binary mathematical file representing the unique features of an individual's fingerprint, eye, hand or voice needed for performing accurate authentication of the individual. A biometric template may be generated in a number of suitable manners. For example, the biometric template may store an indication of a relationship between various biometric features for a user which are derived from the biometric sample. By way of illustrative example, a biometric template may store an indication of a user's eye location with respect to that user's nose. It should be noted that whereas a full biometric sample may require a large amount of memory to store, a biometric template derived from a biometric sample that stores an indication of relationships between features found in the sample may require significantly less memory for storage.

The memory 202 and any additional storage, both removable and non-removable, are examples of non-transitory computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 102 or the enrollment provider server 104. The user device 102 may also contain communications connections that allow the user device 102 to communicate with a stored database, another computing device or server, user terminals, and/or other devices on the network 208. The user device 102 may also include input/output (I/O) device(s) and/or ports, such as for enabling connection with a keyboard, a mouse, a pen, a voice input device, a touch input device, a display, speakers, a printer, etc.

In some examples, the network 208 may include any one or a combination of many different types of networks, such as cable networks, the Internet, wireless networks, cellular networks, and other private and/or public networks. It is noted that the described techniques may apply in other client/server arrangements (e.g., set-top boxes, etc.), as well as in non-client/server arrangements (e.g., locally stored applications, peer to-peer systems, etc.).

The enrollment provider server 104 and/or match server 106 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, one or both of the depicted computing devices may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the enrollment provider server 104 may include at least one memory 210 and one or more processing units (or processors) 212. The processor(s) 212 may be implemented as appropriate in hardware, computer-executable instructions, firmware or combinations thereof. Computer-executable instruction or firmware implementations of the processor(s) 212 may include computer-executable or machine executable instructions written in any suitable programming language to perform the various functions described.

Turning to the contents of the memory 210 in more detail, the memory 210 may include a template encryption module 214 that, when used in conjunction with the processor(s) 212, is configured to encrypt biometric templates received from one or more user devices 102 using homomorphic encryption techniques. The template encryption module 214 may be configured to use a public encryption key associated with the enrollment provider server 104 to encrypt the biometric template. In some embodiments, the template encryption module 214 may decrypt a biometric template received from a user device 102 prior to re-encrypting the biometric template. In some embodiments, the template encryption module 214 may utilize one or more homomorphic cryptosystems available in open source libraries such as the HElib library, the FHEW library, and/or the TFHE library.

The memory 210 may include a homomorphic verification module 216 that, when used in conjunction with the processor(s) 212, is configured to decrypt an encrypted match result received from a match server and determine an extent to which the match is successful. In some embodiments, the homomorphic verification module 216 may receive a data file from a match server 106 that represents a comparison or similarity between two encrypted biometric templates. Because the two biometric templates have been encrypted using the public key associated with the enrollment provider server 104 using homomorphic encryption techniques, the received data file is also encrypted and is decryptable using a private key associated with the enrollment provider server. The homomorphic verification module 216 may be configured to decrypt the received data file to determine an extent to which the two biometric templates match. In some embodiments, the data file may include an indication as to how similar or different the two biometric templates are. The homomorphic verification module 216 may generate a value that represents a likelihood that the users associated with the two biometric templates are the same user. This result, which may be represented as a numeric value (e.g., a percentage), may be provided back to the match server 106. In some embodiments, the result may be provided to a user device 102 associated with the data file.

Additionally, the memory 210 may include encryption key data 218, which stores a public and private encryption key associated with the enrollment provider server 104 as well as encryption keys associated with a number of user devices 102. The memory may also include account data 220, which may store information for one or more users and/or user devices 102 as well as payment/authentication information for the respective users and/or user devices 102. Encryption key data 218 and/or account data 220 may be stored in one or more databases.

The match server 106 may be any suitable type of computing device that interacts with an access device to authenticate a user in a transaction. The match server 106 may include a memory 222 and one or more processors 224 capable of processing user input. Embodiments of the application on the match server 106 may be stored and executed from its memory 222. The memory 222 may store program instructions that are loadable and executable on the processor(s) 224, as well as data generated during the execution of these programs. The memory 222 may include an operating system and one or more application programs or services for implementing the features disclosed herein including at least a module for encrypting a biometric template (template encryption module 226) and/or a module for performing homomorphic comparison on encrypted data (template comparison module 228). The template encryption module 226 may be substantially similar to the template encryption module 214 described above. It should be noted that in some embodiments, a biometric template may be encrypted by an access device before being transmitted to the match server.

The template comparison module 228 may be configured to compare two biometric templates that have been encrypted using a public key associated with the enrollment provider server 104. It should be noted that the match server 106 may not have access to the private key associated with the enrollment provider server 104, hence the template comparison module 228 may not be capable of decrypting the biometric templates. However, since the biometric templates have been encrypted using homomorphic encryption techniques, the template comparison module 228 is able to process the encrypted biometric templates as it would unencrypted biometric templates to produce a data file that represents the differences or similarities between the two biometric templates. The data file produced in this manner is itself encrypted and the match server is also unable to decrypt the data file. Instead, the match server 106 may be configured to transmit the generated data file to the enrollment provider server 104, which will in turn decrypt the data file (e.g., via the homomorphic verification module 216) and return an indication as to the likelihood of a match between the two biometric templates.

Figure 3:
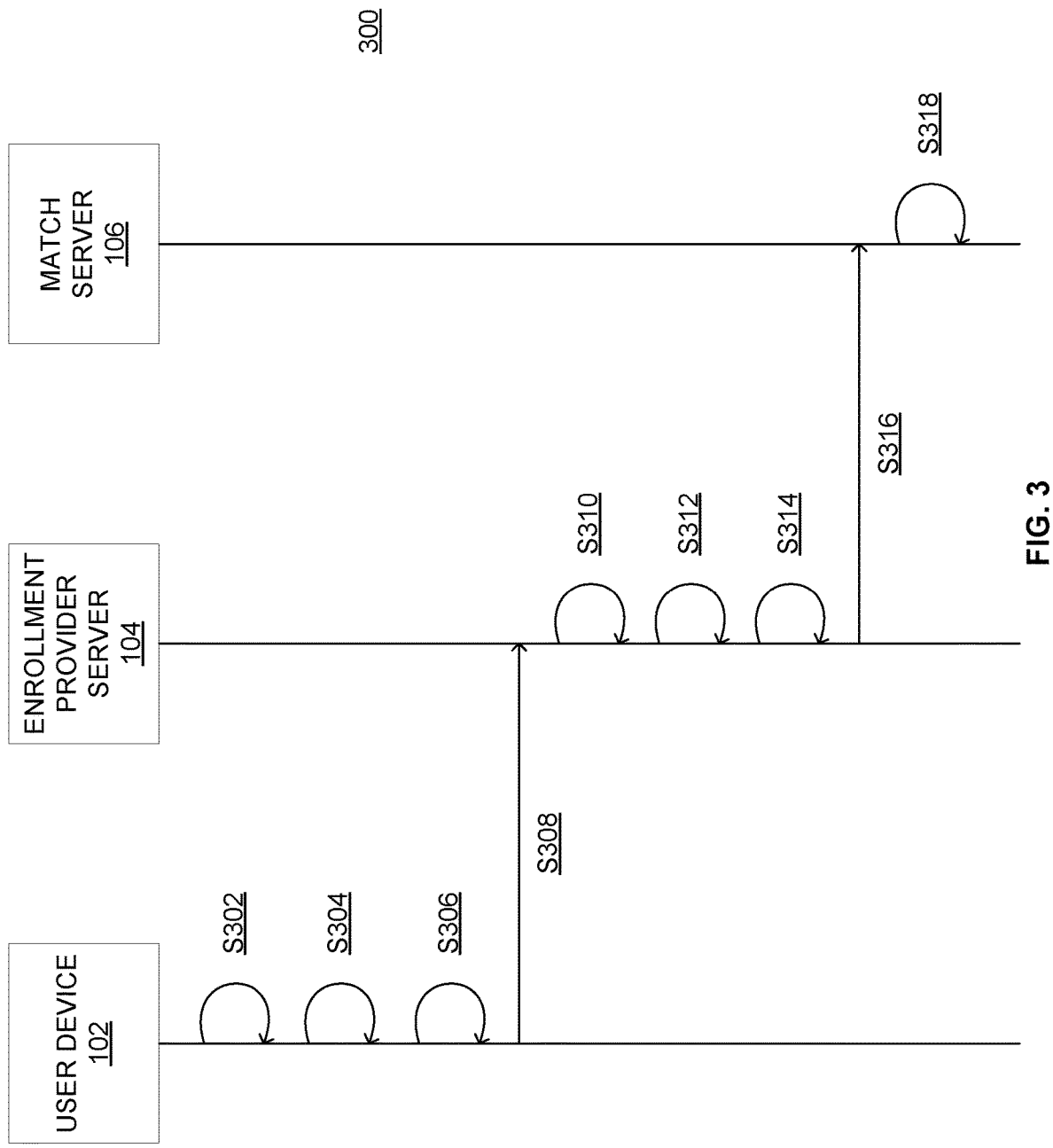
FIG. 3 shows a flow diagram of an enrollment method according to an embodiment of the invention.

FIG. 3 shows a flow diagram of an enrollment method according to an embodiment of the invention. The process 300, or at least portions thereof, may be performed by an example user device 102, enrollment provider server 104, and match server 106 as depicted in FIG. 1 and FIG. 2 and described above.

In an embodiment of the invention, a user may enroll on an enrollment provider mobile application on the user device 102, such as a user smartphone. The enrollment may include enrolling one or more payment instruments, such as credit cards, and obtaining, using the user device 102, a biometric sample, such as a facial image. It may also include a form of authentication, demonstrating to the enrollment provider server 104 that the user who is enrolling is a legitimate owner of the payment instruments. In some embodiments, this may be done by the user inputting a code or password, thus logging the user into an account maintained by the enrollment provider server 104. In some embodiments, the enrollment data may include a biometric template (encrypted or unencrypted) as well as an indication of an account to be linked to embodiments of the disclosure. Upon receiving the enrollment data, the process may involve storing the enrollment data in association with both the account information and the user device from which the enrollment data was received. In some embodiments, the enrollment data may replace existing enrollment data. For example, a user may wish to use a new biometric sample and/or associate the existing biometric template to a different account.

At step S302, the user device 102 may receive a biometric sample from the user of the user device 102. In some embodiments, the user may be prompted to input biometric data using a biometric reader, resulting in the collection of the biometric sample. In some embodiments, the biometric sample may be collected in response to a user having requested enrollment into a system that enables biometric access to a resource. In some embodiments, the user may be required to authenticate that the user is who he or she claims to be at step S302. For example, the user may be required to log into an account maintained by an enrollment provider server 104. The account login may be performed via a mobile application installed upon, and executed from, the user device 102.

At step S304, the user device 102 may process the biometric sample into a first biometric template. In some embodiments, this may involve identifying various biometric features within the obtained biometric sample and identifying relationships between one or more of those features. An indication of those relationships may then be compiled into a biometric template. For example, the biometric template may include an indication as to a relative distance between various facial features of the user 104. In this example, the biometric template may store an indication of the distance between the user's mouth and the user's nose with respect to the distance between the user's nose and the user's forehead.

At step S306, the enrollment provider application on the user device 102 may encrypt the first biometric template in a form that protects its confidentiality and integrity, as well as proves its origin. For example, this may be done using authenticated encryption with derived symmetric keys where the enrollment provider server 104 may have a master key that has been previously used to derive a user specific key or keys from the user or account data (such as PAN). In some embodiments, the user device 102 may, in response to requesting enrollment of a user, be provided with an encryption key to use in encrypting the biometric template. In some embodiments, the encryption key may be a device-specific encryption key which is associated with that user device 102. In some embodiments, the user device 102 may be provided with a public key (of a public-private key pair) associated with the enrollment provider server 104. In some embodiments, a shared secret key may be created for the user device 102 and enrollment provider server 104 using a combination of public-private key pairs (e.g., via a Diffie-Hellman key exchange). The biometric template may then be encrypted using the provided encryption key.

At step S308, the user device 102 may transmit a message including the encrypted biometric template and user identification data to the enrollment provider server 104. The user identification data may identify the user to the enrollment provider server 104. In some embodiments, the user identification data may be a password, a token, or a primary account number (PAN). The user identification data may be encrypted in the same way as the encrypted biometric template. In some embodiments, the encrypted biometric template and the user identification data may be encrypted in different ways.

At step S310, after receiving the message, the enrollment provider server 104 may decrypt the encrypted biometric template and user identification data. The enrollment provider server 104 may validate the integrity and origin of the message. The process may further involve storing the enrollment data in association with both the account information and the user device from which the enrollment data was received. In some embodiments, the biometric template may be encrypted using a public key associated with the enrollment provider server 104. In at least some of those embodiments, the encrypted biometric template may be stored as it was received.

At step S312, the enrollment provider server 104 may generate a biometric identifier, also referred to as a handle (sometimes referred to herein as CH), corresponding to the user. The biometric identifier may be used by external parties. The biometric identifier may be generated such that it does not reveal anything about the user or have links back to the identity of the user or their account (PAN). In some embodiments, the biometric identifier may be a random number or string of characters. In some embodiments, the biometric identifier may be stored in an enrollment provider server database in relation to the user.

At step S314, the enrollment provider server 104 may encrypt the decrypted first biometric template (sometimes referred to herein as TE) previously received from the user with an enrollment provider public key (referred to herein as Pb), wherein the encryption may be written as Pb{TE} for a first encrypted biometric template. If the public key cryptographic system is elliptical-curve based, then El Gamal encryption may be used, as the first encrypted biometric template will be subject to homomorphic operations and as such cannot use a mixed encryption scheme where a payload is encrypted with a symmetric cipher and the symmetric key is in turn encrypted with a public key.

At step S316, after encrypting the decrypted first biometric template to form the first encrypted biometric template, the enrollment provider server 104 may transmit the first encrypted biometric template and the biometric identifier to the match server 106. The biometric identifier may be used by the match server 106 to reference a user account without being provided details about the user. The transmission from the enrollment provider server 104 to the match server 106 may be secure, that is, authenticated and encrypted, e.g. with mutually authenticated transport layer security (TLS).

In some embodiments, the enrollment provider server 104 can delete the decrypted first biometric template as well as the first encrypted biometric template from its system (e.g., the enrollment provider server database) as they may no longer be required at the enrollment provider server 104. In this way no residual information about the first biometric template, even in encrypted form, remains at the enrollment provider server 104.

At step S318, after receiving the first encrypted biometric template and the biometric identifier, the match server 106 may store an association from the biometric identifier to the first encrypted biometric template in a database. Notice, that since the match server 106 does not possess the enrollment provider private key associated with the enrollment provider public key, it cannot decrypt the first encrypted biometric template or recover the first biometric template in any way. Thus, the match server 106 securely stores the first encrypted biometric template and neither the match server 106 nor an entity that hacks into the match server 106 is able to obtain the first biometric template since it is encrypted.

In some embodiments, the user device 102 may not transmit the encrypted biometric template to the enrollment provider server 104, but may transmit the user identification data. In such a case, the enrollment provider server 104 may verify the user through the user identification data. The enrollment provider server 104 may then generate a biometric identifier, and then transmit the biometric identifier to the user device 102. The user device 102 may then encrypt the first biometric template with the enrollment provider public key, and then transmit the first encrypted biometric template as well as the biometric identifier to the match server 106.

Figure 4:
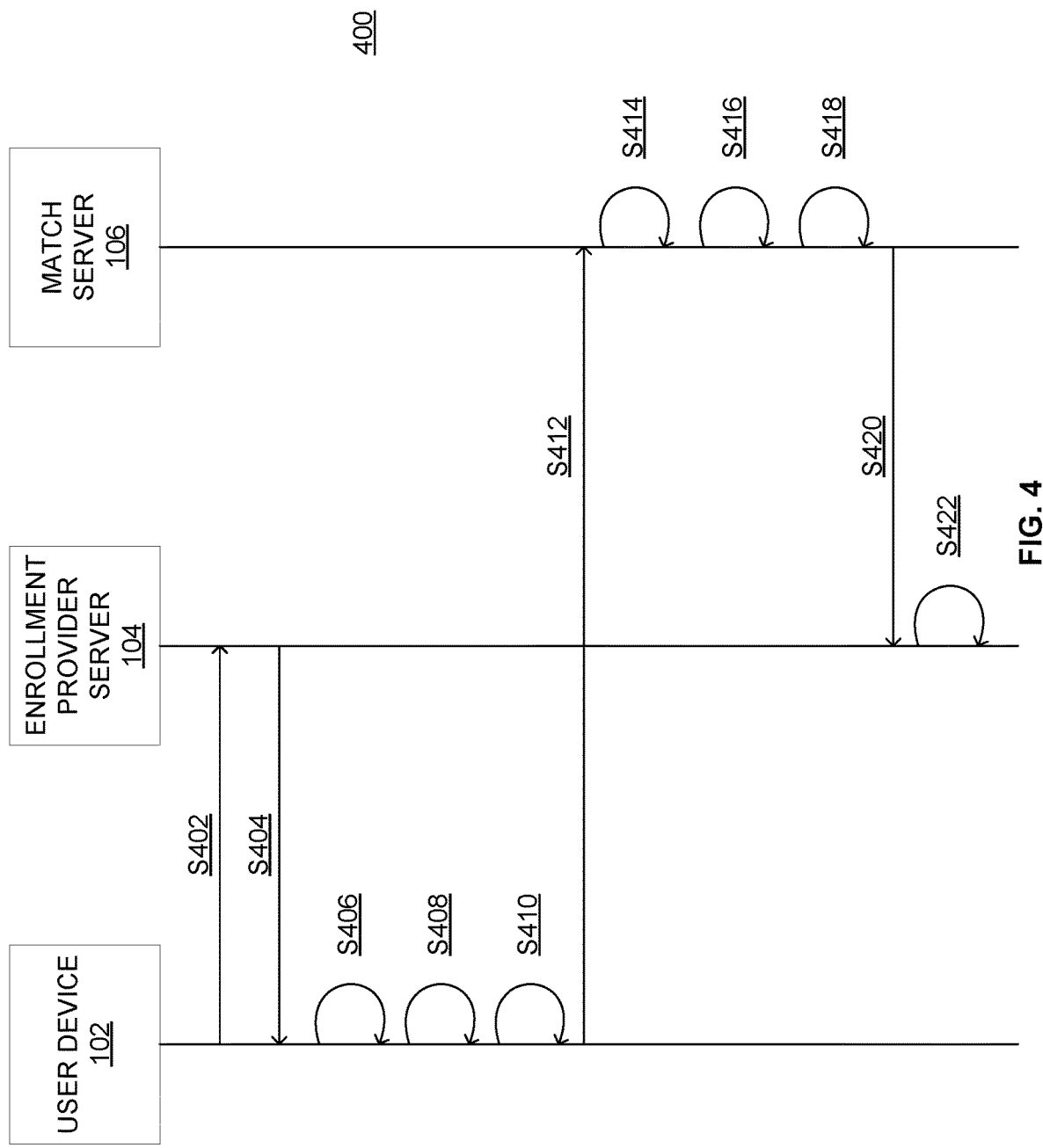
FIG. 4 shows a flow diagram of an authentication method according to an embodiment of the invention.

FIG. 4 shows a flow diagram of an authentication method according to an embodiment of the invention. Similar to the process depicted in FIG. 3, the process 400, or at least portions thereof, may be performed by an example user device 102, enrollment provider server 104, and match server 106 as depicted in FIG. 1 and FIG. 2 and described above.

Authentication may take place in a payment situation inside an application that may not be controlled by the enrollment provider server 104, but, for example, by a resource provider, or while browsing and activating a java script application from a resource provider page. When a user performs an authentication, they may do so on an application or a browser-based java script, such as a resource provider application located on the user device 102. The resource provider application may have access to an enrollment provider public key and/or a match server public key.

At step S402, the resource provider application or java script may contact one of the enrollment provider server 104 or the match server 106, to recover the biometric identifier from information the party may have about the user (e.g. token or PAN). In some embodiments, the resource provider application on the user device 102 may transmit a biometric identifier request message to the enrollment provider server 104. The biometric identifier request message may include user identification data, a request for the biometric identifier, and any other suitable information. The user identification data may be a token, a PAN, or any other suitable identifier.

At step S404, the enrollment provider server 104 may transmit the biometric identifier associated with the user identification data to the user device 102 in response to the received request. In some embodiments, the biometric identifier may be encrypted before being transmitted to the user device 102. For example, the biometric identifier may be encrypted using an encryption key for which the user device 102 has access to a decryption key.

Once the biometric identifier has been recovered by the user device 102, at step S406, the user may be prompted to submit a biometric sample to the user device 102, e.g. take a self-photo (e.g., a selfie) using a camera on the user device 102.

At step S408, the user device 102 may process the biometric sample into a second biometric template (referred to herein as TA). The second biometric template may be generated using techniques substantially similar to those used to generate the first biometric template. In some embodiments, the application or program used to generate the second biometric template may be the same application or program used to generate the first biometric template.

At step S410, in some embodiment, the resource provider application or java script may encrypt the second biometric template with the enrollment provider public key, resulting in a second encrypted biometric template, Pb{TA}. It should be noted that in some embodiments, the match server 106 may encrypt the second biometric template with the enrollment provider public key, resulting in a second encrypted biometric template Pb{TA}. The resource provider application may then encrypt the encrypted (or unencrypted) second biometric template, the biometric identifier, and a transaction identifier (referred to herein as TI) with a match server public key (referred to herein as PbMS), resulting in an encrypted tuple, PbMS{Pb{TA}, CH, TI} The match server public key may be of a mixed form as described above.

At step S412, the resource provider application may transmit the encrypted tuple to the match server 106. The encrypted tuple may be transmitted to the match server 106 in a form that protects its integrity and confidentiality.

At step S414, after the match server 106 receives the encrypted tuple from the resource provider application, the match server 106 may then decrypt the encrypted tuple with a match server private key corresponding to the match server public key, resulting in the second encrypted biometric template, the biometric identifier, and the transaction identifier.

At step S416, the match server 106 may use the biometric identifier to look up the first encrypted biometric template, stored at step S318. This may involve querying a database of encrypted biometric templates stored in association with biometric identifiers.

At step S418, the match server 106 may perform a homomorphic comparison process between the first encrypted biometric template and the second encrypted biometric template, resulting in an encrypted data file (i.e., an encrypted match result), wherein the encrypted data file is in an enrollment provider encryption domain. In other words, the resulting data file may already be encrypted with the public key associated with the enrollment provider server 104 when it is generated. Homomorphic comparison may be a form of encrypted data processing that allows computation on encrypted data, generating an encrypted result which, when decrypted matches the result of the computations as if they had been performed on unencrypted data. In other words, the two templates that are being compared must been in the same encryption domain, in this case the enrollment provider encryption domain, in order to perform homomorphic matching, wherein the result of the matching must also be in the same encryption domain. In some embodiments, this may be represented as Pb{m}:= HE_match(Pb{TE}, Pb{TA}). It should be noted that although the match server 104 is able to perform the homomorphic comparison, the match server is not able to interpret the results of that comparison because it lacks access to the enrollment provider server's private key.

At step S420, the match server 106 may transmit the encrypted match result, the biometric identifier, and the transaction identifier to the enrollment provider server 104 using a secure channel.

At step S422, the enrollment provider server 104 may decrypt the encrypted match result with an enrollment provider private key corresponding to the enrollment provider public key, resulting in a match result.

The match result indicates a likelihood as to whether the first biometric template and the second biometric template match. The match result may be in any suitable form. For example, in some embodiments, the match result may be a value between zero and one hundred, wherein a value of zero represents that the templates do not match, and wherein a value of one hundred represents that the templates completely match. In this example, the value may be represented as a percentage value. In other embodiments, the match result may be either "yes match" or "no match."

In further embodiments, after obtaining the match result data file, the enrollment provider server 104 may transmit a notification regarding the match result to the user device 102. The notification may include the match result as well as information regarding the match result and/or the transaction identifier. For example, the notification may be "the biometric for transaction #521 matches stored biometric."

In other embodiments, the enrollment provider server 104 may transmit the match result, the biometric identifier, and the transaction identifier to the resource provider application and/or the match server 106.

In some embodiments, the match result may be used to authenticate a transaction corresponding to the transaction identifier. In some embodiments, a transaction may be authenticated upon determining that the match result value is greater than some predetermined acceptable risk threshold value. In some embodiments, an acceptable risk threshold value may vary based on the access device from which the request has been received or the type of transaction to be authenticated. For example, some access devices (or entities that operate those access devices) may be willing to take on a greater level of risk than other access devices. It should be noted that a higher acceptable risk threshold value will result in increased security at the cost of having a greater number of false declinations.

Figure 5:
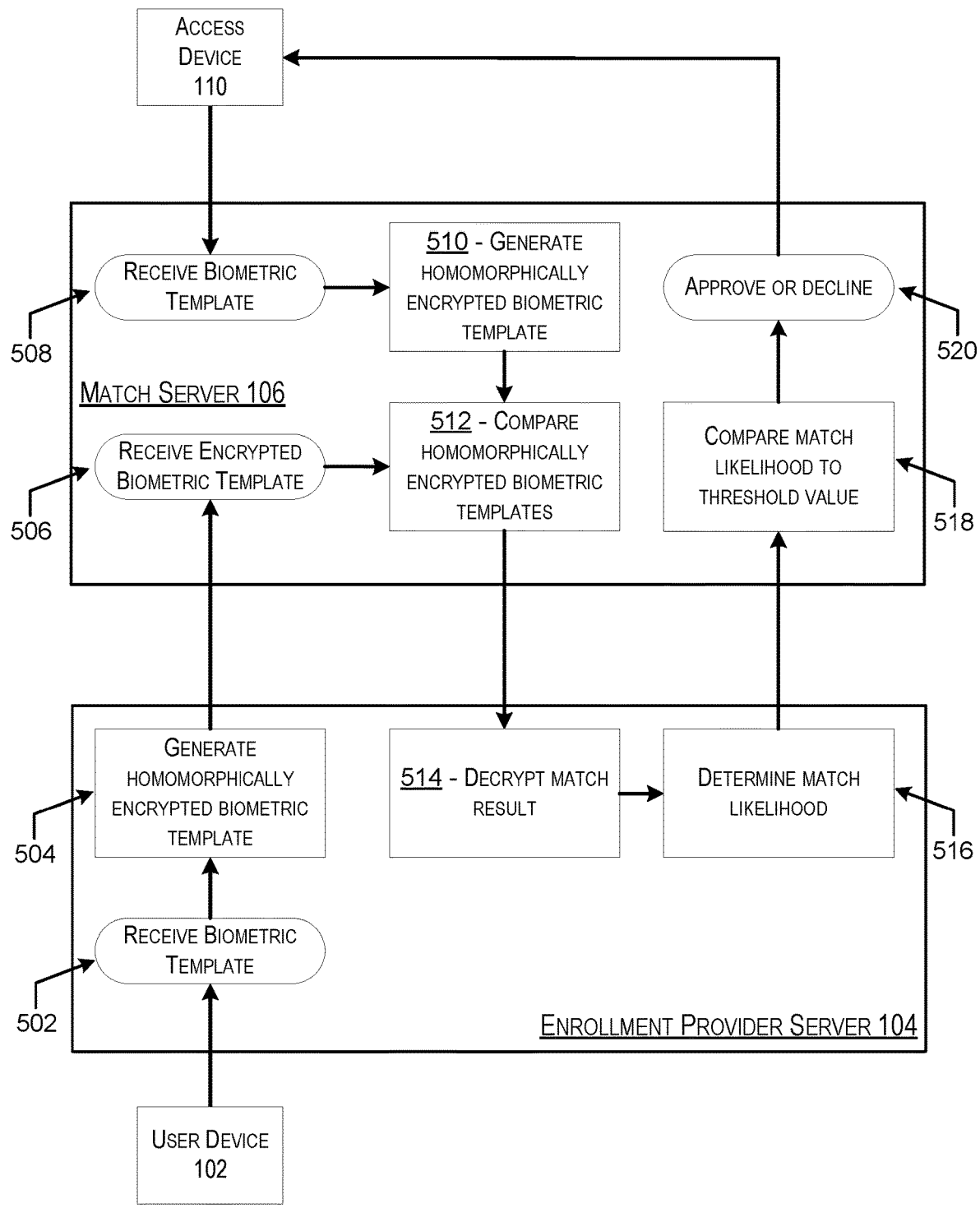
FIG. 5 depicts a flow chart depicting example interactions that may take place between an enrollment provider server and a match server in accordance with at least some embodiments.

FIG. 5 depicts a flow chart depicting example interactions that may take place between an enrollment provider server and a match server in accordance with at least some embodiments.

In some embodiments, the enrollment provider server 104 may receive a request for enrollment from a user device 102. In some embodiments, the enrollment provider server 104 may respond to the request for enrollment by providing an encryption key (e.g., a public encryption key associated with the enrollment provider server 104). Once the user device 102 has received the encryption key, it may prompt a user to provide a biometric sample via one or more input sensors of the user device 102. For example, the user device may prompt the user to take a picture of his or her face using a camera device installed in the use device 102. The user device 102 may generate a biometric template from the received biometric sample. In some embodiments, the user device may also prompt the user for a password or other authentication means that may be used to verify the authenticity of the user. Additionally, the user device 102 may prompt the user to provide an indication of one or more accounts (e.g., payment accounts) to be enrolled into the system described herein. The user device may transmit each of the biometric template and indication of an account to the enrollment provider server at 502. In some embodiments, the enrollment provider server may assign a biometric identifier to be associated with the biometric template and user device 102. The enrollment provider server may transmit the biometric identifier to the user device 102 (e.g., within a confirmation that the biometric template has been received).

At 504, the enrollment provider server 104 may generate a homomorphically encrypted biometric template from the biometric template that it received from the user device at 502. To do this, the enrollment provider server 104 may encrypt the received biometric template using its public key. The encrypted biometric template may then be sent to the match server 106. It should be noted that although the interactions depicted in FIG. 5 illustrate an embodiment in which the enrollment provider server encrypts the biometric template, the biometric template may be encrypted by the user device 102 in at least some embodiments. In at least some of those embodiments, the user device may also transmit the encrypted biometric template directly to the match server 106 (e.g., via a mobile application installed upon the user device 102).

At 506, the match server 106 may receive the encrypted biometric template and the biometric identifier from the enrollment provider server 104. The match server 106 may store the encrypted biometric template in association with the biometric identifier within a database or other storage means. At this point, interactions between the various components of the system may cease (with respect to this particular transaction) until the operator of the user device 102 wishes to complete a transaction using the system.

When the operator of the user device 102 is ready to conduct a transaction using the described system, the user device may provide a biometric sample (or biometric template generated from a biometric sample) to an access device 110 along with the biometric identifier. In the event that the access device 110 receives a biometric sample (e.g., in the case that the biometric sample was collected by a camera of the access device), the access device 110 may generate a biometric template from that biometric sample, which it may forward to the match server 106. At 508, the match server 106 may receive the biometric template and the biometric identifier from an access device 110. The access device may be any computing device that manages access to a resource, including a website that sells goods and/or services (e.g., an online retailer). In some embodiments, the match server 106 may be an operator of a website.

At 510, the match server 106 may generate a homomorphically-encrypted biometric template. To do this, the match server 106 may use the public key associated with the enrollment provider server 104 to encrypt the biometric template received from the access device 110 in substantially the same manner as the encrypted biometric template was generated at 504, with the only difference in the process being which underlying biometric template is being encrypted.

At 512, the match server 106 may retrieve the encrypted biometric template received at 506 (e.g., based on the provided biometric identifier). Once retrieved, the match server 106 may perform a comparison between the encrypted biometric template received at 506 and the encrypted biometric template generated at 510. The match server 106 may generate a match result data file which represents a similarity or difference between the two biometric templates. Because each of the biometric templates has been encrypted using homomorphic encryption techniques, the resulting data file will be inherently encrypted. Hence, the match server 106 will not be able to interpret the match result data file even though it generated that data file. Accordingly, in order to retrieve the result of the match result, the match server 106 may transmit the match result data file to the enrollment provider server 104. The match result data file may be provided with the biometric identifier as well as a transaction identifier.

At 514, the enrollment provider server 104 may receive the match result data file from the match server 106. In some embodiments, the enrollment provider server may also receive the biometric identifier as well as a transaction identifier that can be used to identify the transaction/user associated with the match result. Upon receiving the match result, the enrollment provider server 104 may decrypt the match result data file using its private key.

At 516, the enrollment provider server 104 may interpret the decrypted match result data file to determine a likelihood that the two biometric templates were generated from biometric samples taken from the same user. In some embodiments, the decrypted data file may represent a difference or similarity between the two biometric templates. For example, the biometric templates may include an indication of relationships between various biometric features of a user. In this example, the match result data file may include an indication as to how much those relationships differ between the two biometric templates. In some embodiments, the match likelihood may be expressed as a numeric value. The enrollment provider server 104 may provide an indication of the match likelihood value to the match server 106 and/or the user device 102.

At 518, the match server 106 may receive the match likelihood value and determine, based on the received match likelihood value, whether to approve or decline the transaction. In some embodiments, the match server 106 may maintain a predetermined acceptable risk threshold value which represents a numeric value over which the biometric templates should be considered to have been generated from the same user. For example, the match server 106 may maintain an acceptable risk threshold value of 98%, in which match likelihood values greater than or equal to 98% will be considered authenticated.

At 520, the match server 106 may approve or decline the transaction based on whether or not the match likelihood value is above or below the acceptable risk threshold value. In some embodiments, the match server 106 may convey the match likelihood value to the access device 110, which may determine whether to approve or decline the transaction. In some embodiments, the match server 106 may provide the access device 110 with an indication as to whether the authentication of the user is, or is not, successful.

Figure 6:
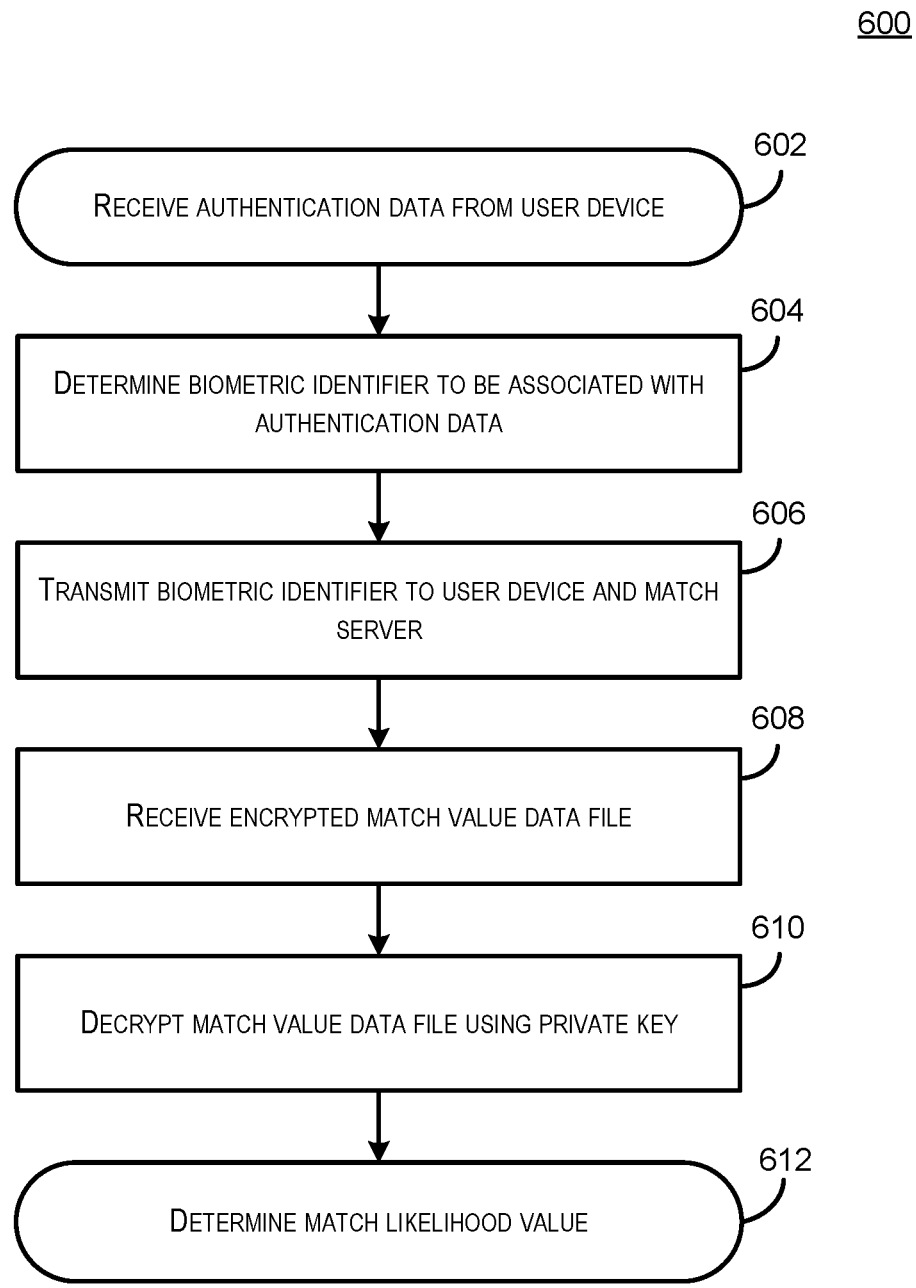
FIG. 6 depicts an flow diagram illustrating an example process for determining a match likelihood value for user authentication in accordance with at least some embodiments.

FIG. 6 depicts an flow diagram illustrating an example process for determining a match likelihood value for user authentication in accordance with at least some embodiments. Process 600 may be performed by an example enrollment provider server 104 as depicted in FIG. 1.

Process 600 may begin at 602, when the enrollment provider server receives authentication data from a user device. In some embodiments, the authentication data may include a biometric template as well as account information to be linked to the biometric template at the enrollment provider server.

At 604, process 600 may involve determining a biometric identifier to be associated with the received authentication data. In some embodiments, the biometric identifier may be generated as a string of random characters. In some embodiments, the biometric identifier may be assigned as a primary key designated to uniquely identify table records within a database table in which at least a portion of the authentication data is stored. In some embodiments, the process 600 may involve encrypting a biometric template received from the user device 102 (e.g., within the authentication data) and, in some cases, storing that encrypted biometric template in a database in relation to the biometric identifier.

At 606, process 600 may involve transmitting the biometric identifier to a user device and/or a match server. In some embodiments, the biometric identifier may be transmitted to a match server along with a first encrypted biometric template. In at least some of these embodiments, the biometric identifier may also be transmitted to the user device from which the authentication data was received. In some embodiments, the biometric identifier may be transmitted to the user device along with a public encryption key associated with the system. In at least some of these embodiments, the user device may generate and subsequently encrypt a biometric template using the provided encryption key. The user device may then transmit the encrypted biometric template directly to the match server along with the biometric identifier. In each of the scenarios presented above, the match server may then store the biometric identifier in relation to the encrypted biometric template.

At 608, process 600 may involve receiving an encrypted match value data file. In some embodiments, the match server computer subsequently receives a second encrypted biometric template and the biometric identifier from the user device, and generates an encrypted match value data file by comparing the first encrypted biometric template and the second encrypted biometric template. The second encrypted biometric template may be encrypted using the same public key as the first encrypted biometric template. The match value data file may include a delta or difference or similarity in data between the first encrypted biometric template and the second encrypted biometric template. It should be noted that generating an encrypted match value data file should not involve decrypting the data from either the first encrypted biometric template or the second encrypted biometric template.

At 610, process 600 may involve decrypting the received match value data file. To do this, the system may use a private key corresponding to the public key used to encrypt both the first encrypted biometric template and the second encrypted biometric template. One skilled in the art would recognize that a number of decryption techniques are available for use at this step. The particular decryption technique used will be dependent upon the type of encryption technique used.

At 612, process 600 may involve determining a match likelihood value. In some embodiments, this may involve interpreting the decrypted match result data file to determine a likelihood that the two biometric templates were generated from biometric samples taken from the same user. In some embodiments, the decrypted match value data file may represent a difference or similarity between the two biometric templates. For example, the biometric templates may include an indication of relationships between various biometric features of a user. In this example, the match result data file may include an indication as to how much those relationships differ between the two biometric templates. In some embodiments, the match likelihood may be expressed as a numeric value. In some embodiments, the system may provide an indication of the match likelihood value to the match server and/or the user device.

Embodiments of the disclosure provide for a number of advantages over conventional systems. For example, the system described enables entities to utilize biometric authentication in their applications without exposing those entities to sensitive information. In embodiments of the system, a developer is able to incorporate biometric authentication (e.g., facial recognition) of a user into their application without being given access to that user's decrypted biometric information. Hence, the developer, which may be an untrusted party, is not then able to redistribute a user's biometric information or use it for nefarious purposes. At the same time, by enabling third parties (e.g., the match server) to perform biometric template comparisons, the system can significantly reduce its own workload, resulting in huge increases to available processing power.

In addition, the methods and systems are secure and scalable. Since the biometric template data is encrypted in the match server, it is secure from an data breaches as the encrypted template data is useless on its own. Further, each match server may be operated by different entities such as different merchants, different banks, or different organizations. Each entity may holds its own users' data and perform the cryptographic matching process. This not only partitions the data according to the appropriate entity, but as noted above, distributes the computational requirements associated with the matching processes that are performed. However, the enrollment server can be the only computer in the system that ever has possession of a biometric template in unencrypted form. As such, only one server computer needs to be made highly secure, while multiple other match servers may exist and may have less security than the enrollment server. As such, embodiments of the invention are very scalable.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a first server computer, authentication data for a user from a user device including user identification data that identifies the user;
   determining, by the first server computer, a biometric identifier as a random number or string of characters that does not reveal information about the user, to be associated with the authentication data;

transmitting, by the first server computer, the biometric identifier to a second server computer along with a first encrypted biometric template associated with the user;

upon receiving a request for the biometric identifier, transmitting, by the first server computer to the user device, the biometric identifier encrypted with an encryption key corresponding to a decryption key, wherein having by the user device the decryption key enables the user device to decrypt the encrypted biometric identifier, wherein the decrypting the encrypted biometric identifier by the user device causes the second server computer to subsequently receive a second encrypted biometric template and the biometric identifier from the user device, wherein the second server computer generates an encrypted match value data file by comparing the first encrypted biometric template and the second encrypted biometric template based on the biometric identifier;

receiving, by the first server computer, the encrypted match value data file;

decrypting, by the first server computer, the encrypted match value data file to determine a decrypted match value data file; and determining, from the decrypted match value data file, a match likelihood value.

2. The method of claim 1, wherein the first server computer is an enrollment server computer and the second server computer is a match server computer.

3. The method of claim 1, wherein the second encrypted biometric template is received by the second server computer in relation to a transaction to be completed by the user.

4. The method of claim 1, wherein the match likelihood value represents a likelihood that the first encrypted biometric template and the second encrypted biometric template are generated from the same user.

5. The method of claim 1, wherein the match likelihood value is represented as a numeric value.

6. The method of claim 1, further comprising comparing the match likelihood value to an acceptable risk threshold value to determine whether the user is authenticated.

7. The method of claim 1, wherein each of the first encrypted biometric template and the second encrypted biometric template are encrypted using a public key associated with the first server computer.

8. The method of claim 7, wherein the encrypted match value data file is decrypted using a private key associated with the first server computer.

9. The method of claim 1, further comprising providing an indication to the second server computer as to whether or not the first encrypted biometric template and the second encrypted biometric template match, wherein the indication is provided based on the match likelihood value.

10. A server computer comprising:
a processor; and
a non-transitory computer-readable storage medium having code embodied thereon, the code being configured to cause the processor to:
  receive authentication data for a user from a user device including user identification data that identifies the user;
  determine a biometric identifier as a random number or string of characters that does not reveal information about the user, to be associated with the authentication data;
  transmit the biometric identifier to a second server computer along with a first encrypted biometric template associated with the user;
  upon receiving a request for the biometric identifier, transmit, to the user device, the biometric identifier encrypted with an encryption key corresponding to a decryption key, wherein having by the user device the decryption key enables the user device to decrypt the encrypted biometric identifier, wherein the decrypting the encrypted biometric identifier by the user device causes the second server computer to subsequently receive a second encrypted biometric template and the biometric identifier from the user device, wherein the second server computer generates an encrypted match value data file by comparing the first encrypted biometric template and the second encrypted biometric template based on the biometric identifier;
  receive the encrypted match value data file;
  decrypt the encrypted match value data file to determine a decrypted match value data file; and
  determine, from the decrypted match value data file, a match likelihood value.

11. The server computer of claim 10, wherein the second server computer performs a comparison of the first encrypted biometric template with the second encrypted biometric template without accessing an unencrypted data within the first encrypted biometric template, and
wherein the unencrypted data is a plaintext.

12. The server computer of claim 10, wherein the first encrypted biometric template and the second encrypted biometric template are both encrypted using a public key associate with the server computer and using the same encryption technique.

13. The server computer of claim 12, wherein the same encryption technique comprises a homomorphic encryption technique.

14. The server computer of claim 10, wherein the encrypted match value data file comprises an indication of a similarity between the first encrypted biometric template and the second encrypted biometric template.

15. The server computer of claim 14, wherein the decrypted match value data file comprises an indication of a similarity between a first decrypted biometric template and a second decrypted biometric template.

16. The server computer of claim 15, wherein the match likelihood value is determined based on the similarity.

17. The server computer of claim 10, wherein the biometric identifier is transmitted to the second server computer via a secure channel.

18. A method comprising:
receiving, at a match server from a service provider computer, a plurality of encrypted biometric templates and a plurality of biometric identifiers, respectively, wherein the plurality of biometric identifiers correspond to a plurality of users, respectively, each of the plurality of biometric identifiers comprising a random number or string of characters that does not reveal information about a corresponding user;
receiving, by the match server from an access device, an encrypted authentication biometric template associated with a transaction and a first biometric identifier corresponding to a first user operating a user device among the plurality of users, wherein the user device obtained the first biometric identifier as an encrypted first biometric identifier encrypted with an encryption key corresponding to a decryption key, wherein having by the user device the decryption key enabled the user device to decrypt the encrypted first biometric identifier, wherein the decrypting the first biometric identifier by the user device caused the match server to receive the encrypted authentication biometric template and the first biometric identifier;

generating, by the match server, a plurality of encrypted match result data files by comparing the encrypted authentication biometric template to each of the plurality of encrypted biometric templates;

identifying, from the plurality of encrypted match result data files, a match between one of the plurality of encrypted match result data files and the encrypted authentication biometric template; and initiating the transaction using account information associated with the closest match.

* * * * *

UNITED STATES PATENT AND TRADEMARK OFFICE
CERTIFICATE OF CORRECTION

PATENT NO. : 11,943,363 B2
APPLICATION NO. : 16/769425
DATED : March 26, 2024
INVENTOR(S) : John F. Sheets et al.

It is certified that error appears in the above-identified patent and that said Letters Patent is hereby corrected as shown below:

In the Claims

In Claim 18, Column 23, Line 13, please remove "the closest match" and insert -- the match --

Signed and Sealed this
Eleventh Day of June, 2024

Katherine Kelly Vidal
*Director of the United States Patent and Trademark Office*